US010079726B1

United States Patent
Tsao

(10) Patent No.: US 10,079,726 B1
(45) Date of Patent: *Sep. 18, 2018

(54) SYSTEM AND METHOD FOR DISPLAYING AND OPERATING MULTI-LAYERED ITEM LIST IN WEB BROWSER WITH SUPPORTING OF CONCURRENT USERS

(71) Applicant: Sheng Tai (Ted) Tsao, Fremont, CA (US)

(72) Inventor: Sheng Tai Tsao, Fremont, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/201,828

(22) Filed: Jul. 5, 2016

Related U.S. Application Data

(63) Continuation of application No. 13/932,277, filed on Jul. 1, 2013, now Pat. No. 9,449,009, which is a continuation of application No. 13/050,871, filed on Mar. 17, 2011, now Pat. No. 8,589,527, which is a continuation of application No. 11/374,302, filed on Jul. 2, 2004, now Pat. No. 7,945,652, which is a continuation-in-part of application No. 10/713,904, filed on Aug. 6, 2002, now Pat. No. 7,418,702, and a continuation-in-part of application No. 10/713,905, filed on Aug. 12, 2002, now Pat. No. 7,379,990.

(60) Provisional application No. 60/401,238, filed on Aug. 6, 2002, provisional application No. 60/402,626, filed on Aug. 12, 2002.

(51) Int. Cl.
*H04L 12/24* (2006.01)
*H04L 12/715* (2013.01)

(52) U.S. Cl.
CPC ...... *H04L 41/0893* (2013.01); *H04L 41/0806* (2013.01); *H04L 41/12* (2013.01); *H04L 45/04* (2013.01)

(58) Field of Classification Search
CPC .............................. H04L 43/045; H04L 41/22
See application file for complete search history.

(56) References Cited

U.S. PATENT DOCUMENTS

| 2002/0052941 | A1* | 5/2002 | Patterson | ............. G06F 9/5061 709/223 |
| 2005/0216860 | A1* | 9/2005 | Petrov | ..................... H04L 41/22 715/810 |

* cited by examiner

Primary Examiner — Tom Y Chang

(57) ABSTRACT

Displaying and operating computing resources by using information list for the computing resources has been practiced by operating system for very long time. For example, the file system in local Windows environment is displayed and operated through Windows Explore of Microsoft. This invention has disclosed a method and system of utilizing memory bound multi-layered item list to mirror an actual resource structure for more efficiently displaying and operating the computing resources in the World Wide Web environment that effectively reduces the usage of computing power and network bandwidth, thus provides a way for faster and easy accessing resource structures over the World Wide Web.

20 Claims, 13 Drawing Sheets

This figure illustrates one embodiment of how does the file system on a system unit in a system group of the virtual server can be accessed.

Fig. 1: A Typical CCDSVM with Multiple Clients
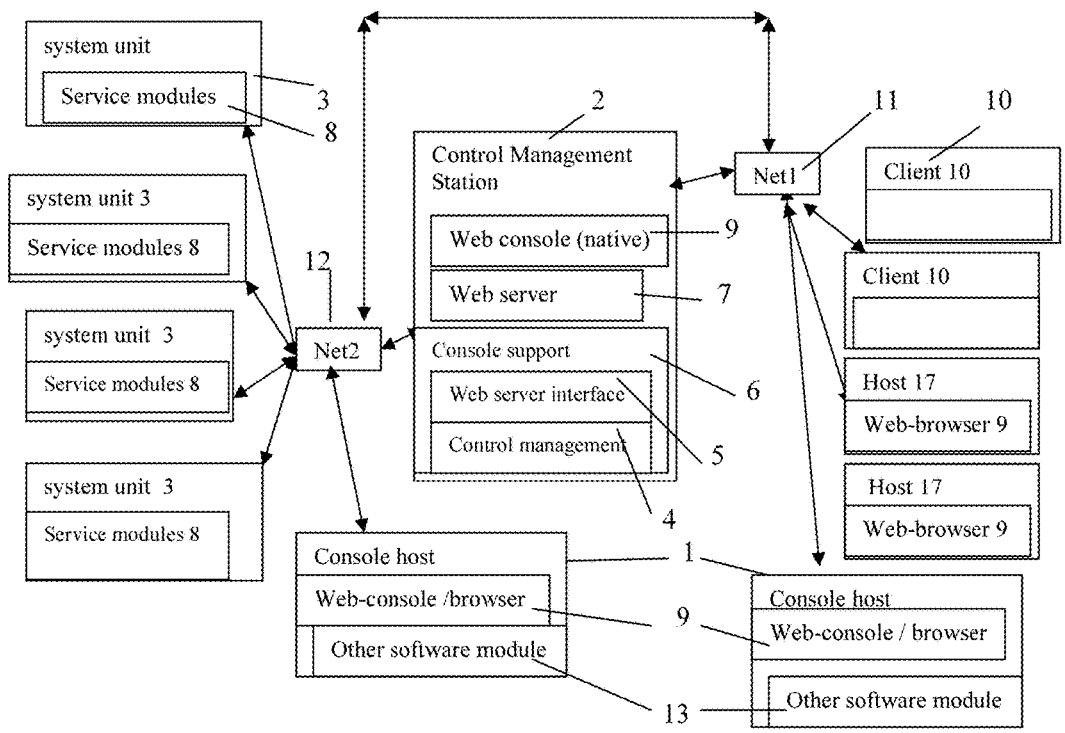

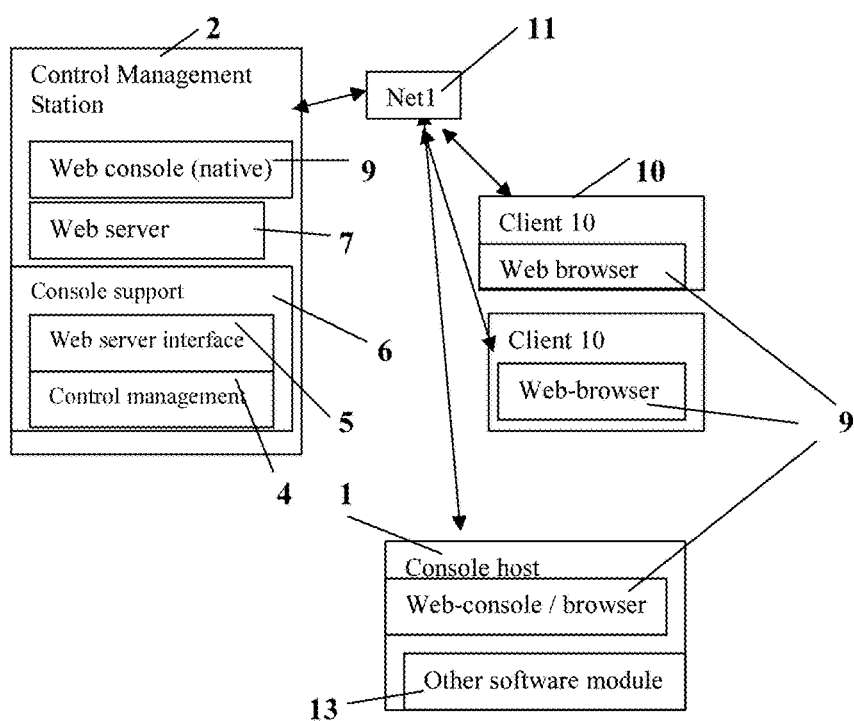
Fig. 2 a) An example of a degenerated CCDSVM with a control system only Fig. 2 b) An example of a CCDSVM with identical system unit and client host
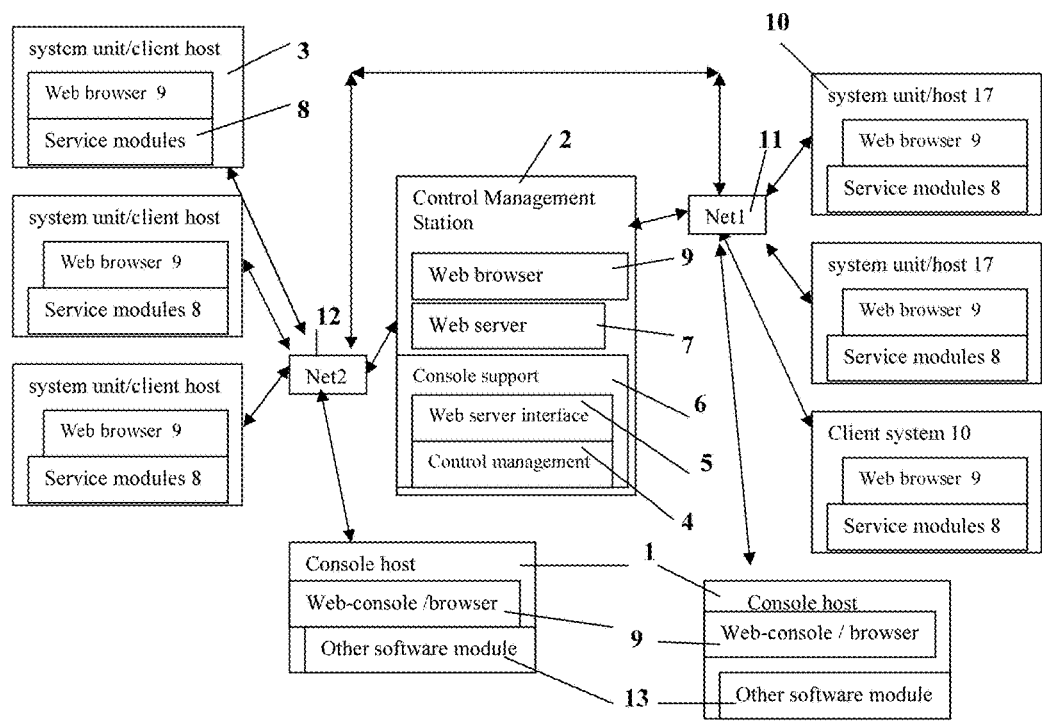

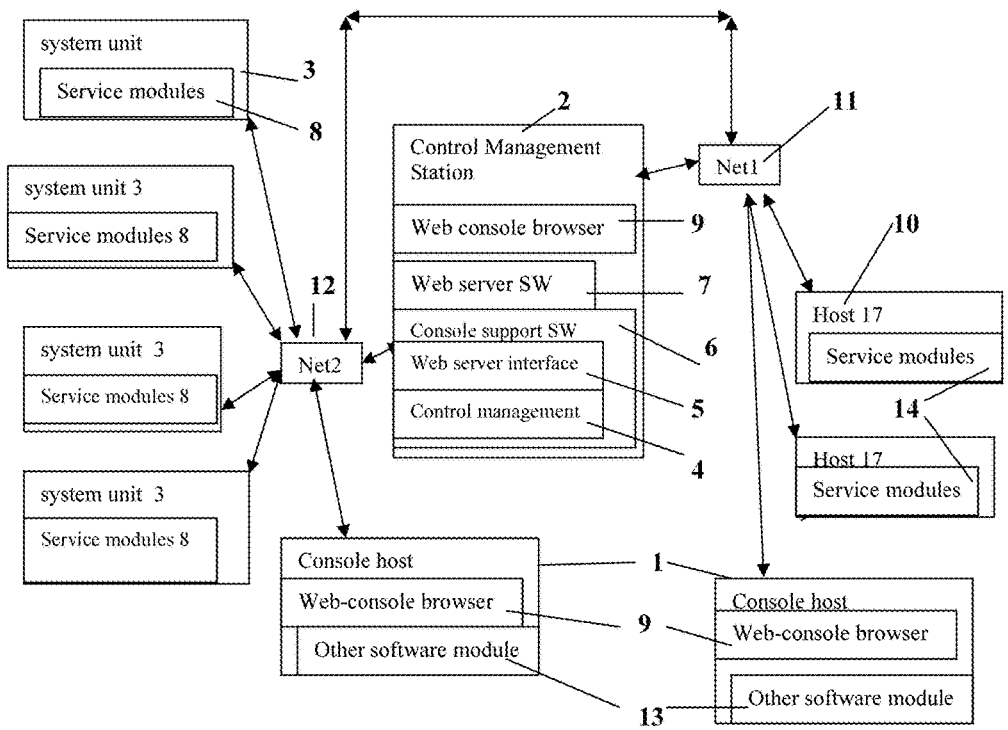
Fig. 2 c) An example of a CCDSVM for non-web based client access and web-based control management Fig. 3) The Software of WCUWE for a typical CCDSVM:
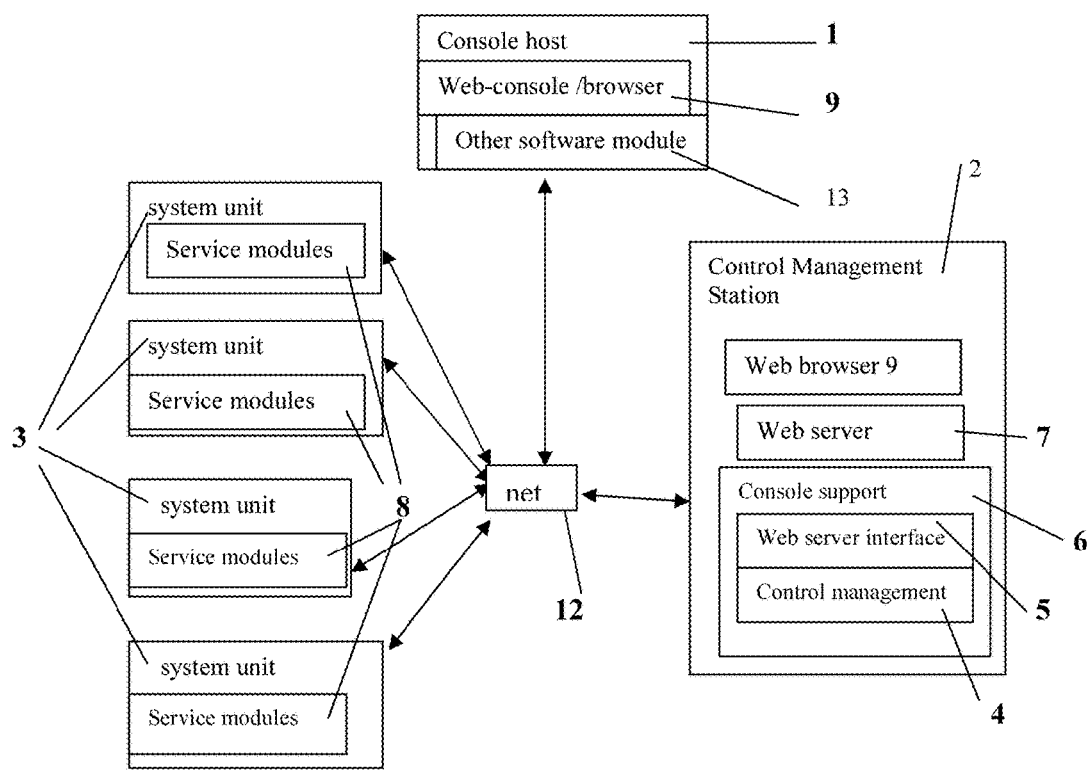

Fig. 4: Examples of Multi-Layer Items List:
4a) 4b)
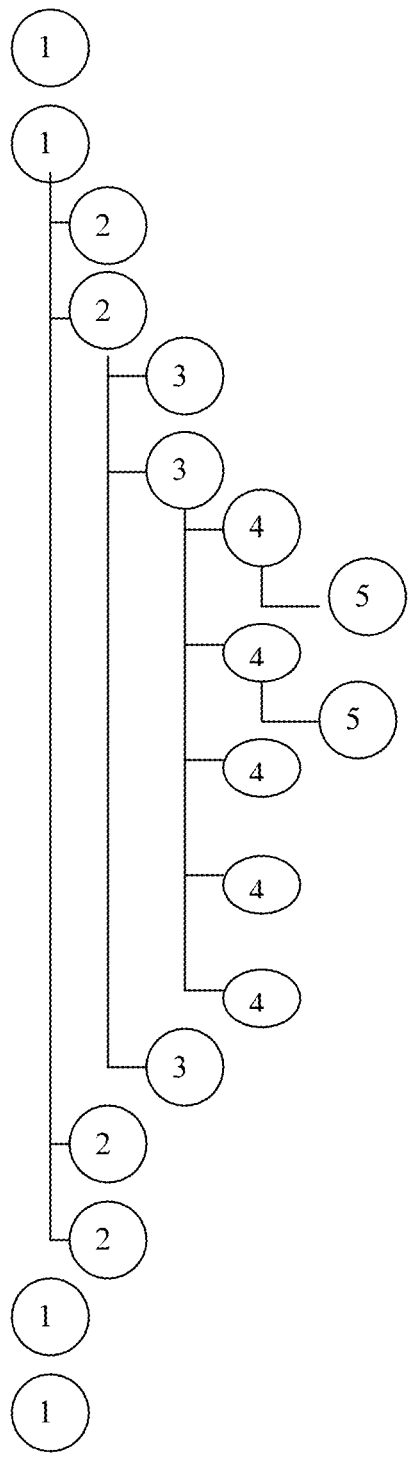

Fig. 5, Examples of web based operation menu
5 a) Web based drop down menu for disk operation.
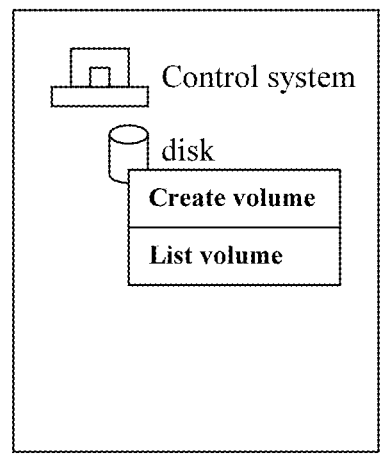
5 b) Web based selective menu for selecting an system unit:

Fig. 6: Examples of web based operation menu for different type of resource node on a MLIL.
6 a) an operation menu for managing a disk storage.
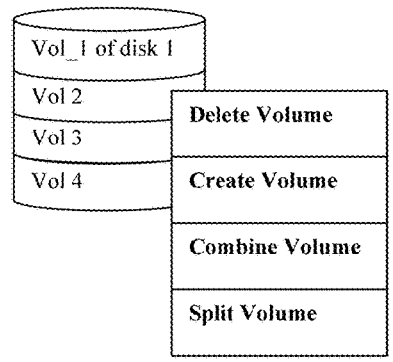
6 b) an operation menu for managing files and folders.
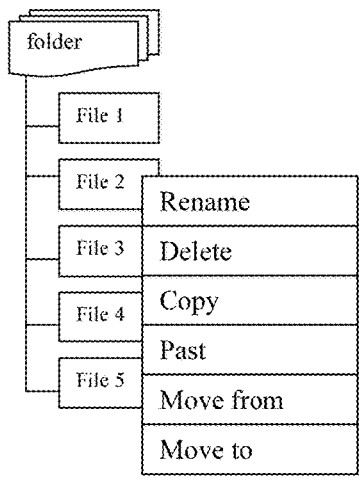

Fig. 6 C) a web based operation menu for managing system units on network.
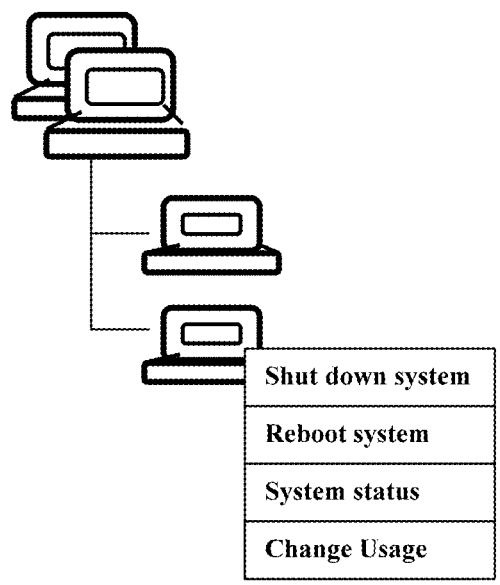

Fig. 7: An example of system units are automatically and dynamically grouped by using group ID.
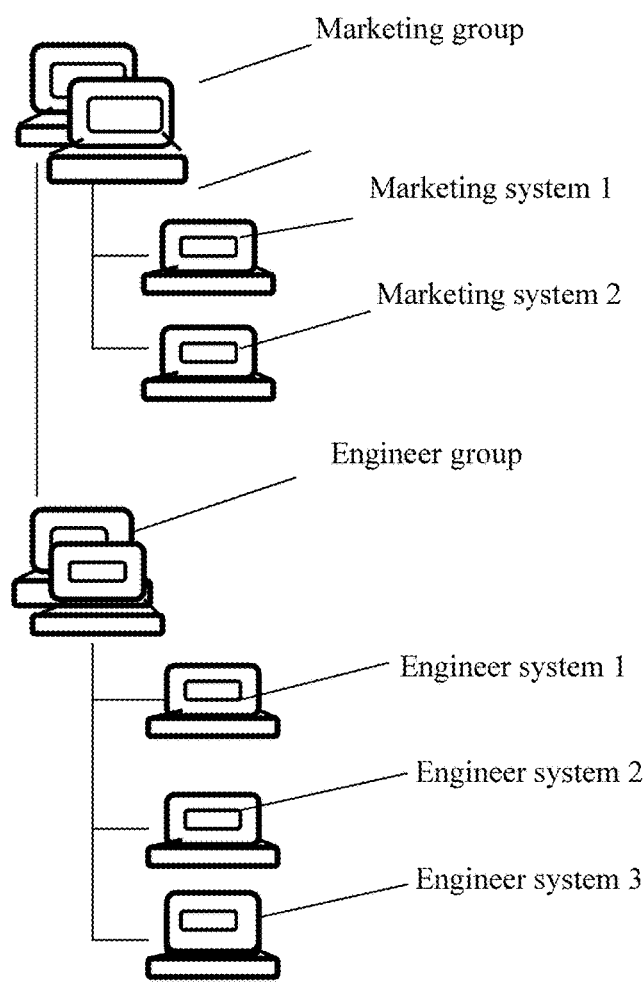

Fig. 8 a): An example of a MLIL representing a structure combined with mixed devices, system units and groups.
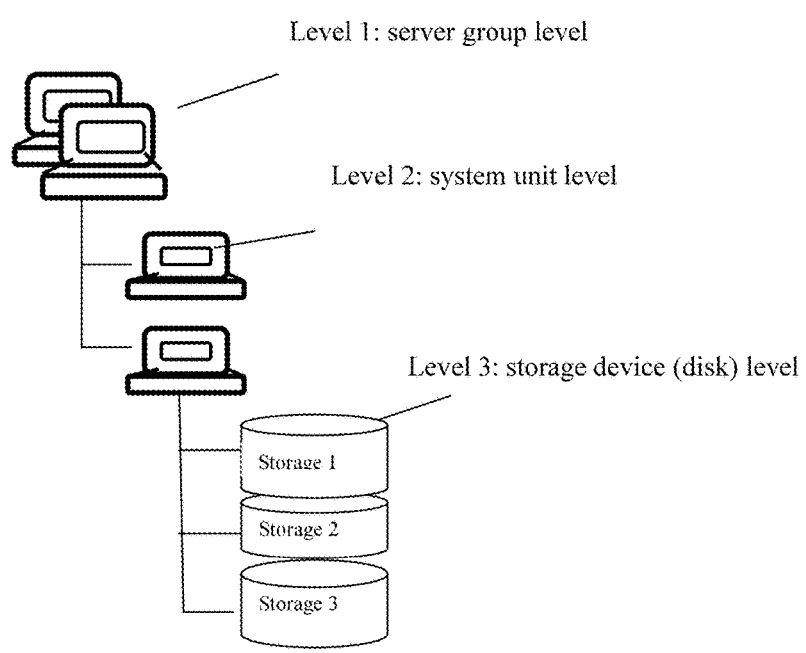

Fig. 8 b) This example illustrates that the top level of a MLIL is for system group, the second level of the MLIL is for system unit, and folders and files start from the third level of the MLIL.
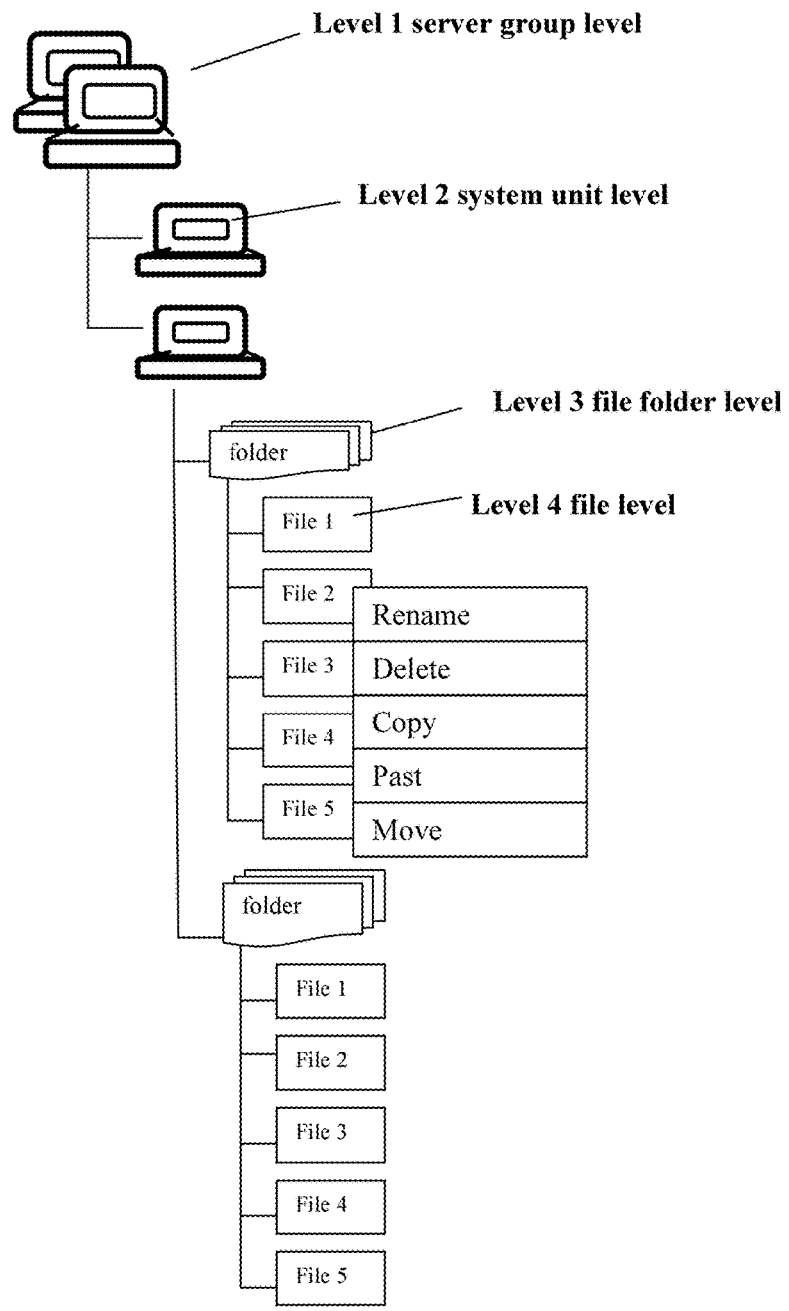

Fig. 9 This figure illustrates one embodiment of how does the file system on a system unit in a system group of the virtual server can be accessed.
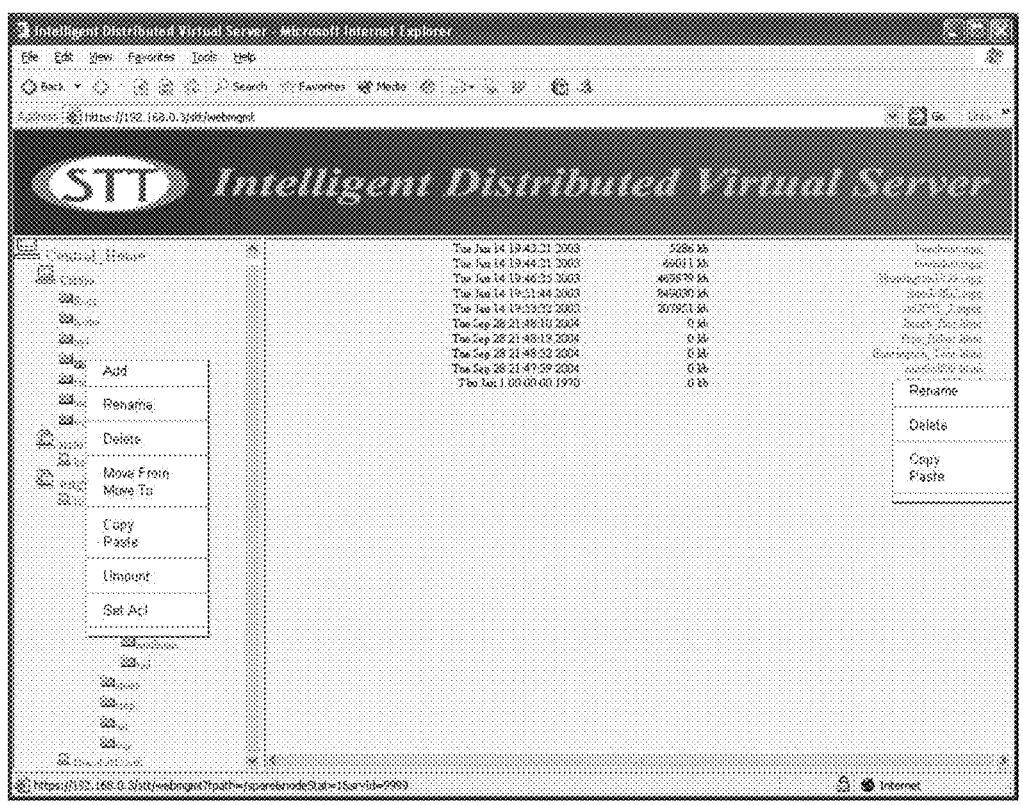

though the computing environments allow
SYSTEM AND METHOD FOR DISPLAYING AND OPERATING MULTI-LAYERED ITEM LIST IN WEB BROWSER WITH SUPPORTING OF CONCURRENT USERS

PRIORITY and CROSS REFERENCES

This is a continuation of U.S. patent application Ser. No. 13/932,277 file on Jul. 1, 2013 and now a U.S. Pat. No. 9,449,009, which itself is a continuation of U.S. patent application Ser. No. 13/050,871 filed on Mar. 17, 2011 and now a U.S. Pat. No. 8,589,527, which itself is a continuation of U.S. application Ser. No. 11/374,302 filed on Jul. 2, 2004 and now is a U.S. Pat. No. 7,945,652. The application Ser. No. 11/374,302 is a continuation-in-part of U.S. patent application Ser. No. 10/713,904, filed on Aug. 6, 2002 and now is a U.S. Pat. No. 7,418,702. The application Ser. No. 11/374,302 is also a continuation-in-part of U.S. patent application Ser. No. 10/713,905, filed on Aug. 12, 2002, and now is a U.S. Pat. No. 7,379,990. All above mentioned applications and patents are herein incorporated by reference in their entireties for all purposes.

BACKGROUND OF THE INVENTION

Field of Invention

The present invention is in the area of network communication, and particularly related to multiple users concurrently interacting with multiple computers to display, view, access, operate various resources (e.g., via multi-layers item list) by using a web browser In addition, the present invention is also related to methods and steps of constructing a web-based computer user work (operation) environment.

Description of Related Art

The evolution of computer-related working environment has changed from paper tape or punch cards of early years to a command line user work environment on a native system in 70th, and to a graphic window environment on a native system in the middle 80$^{th}$. Since then, there have been some network-based computing environments developed such as Microsoft's terminal service, the Telnet of Unix & Linux system, and etc. These computing environments allow users to access and operate a target system from another remote system. Some network management software has also been developed to mostly focus on monitoring the activities of a target system. However, most of the software are limited in mobility and capability because they need to install the specialized software on the remote system instead of conventional tool as web browser. For example, the Windows Explore type of tool in the terminal service or in the Windows of Microsoft can not be directly implemented for being used in a web browser.

There are some web-based application software that allow users to access web applications on a web server from a web browser running on a remote system or device. However, most of such application software are not designed for managing resources on a web server and/or for creating a web-based computer user working environment. There are also some web-based software that allow people to manage a system remotely. Again such software is not designed to create a web-based computer user working environment instead of dumping the existing computer user work environment of a system to a web browser on a remote system.

Thus there is a need for the user-friendly environment that users can concurrently access and manage resources with ease.

SUMMARY

This section summarizes some aspects of the present disclosure and briefly introduces some aspects in preferred embodiments. Simplifications or omissions in this section as well as in the abstract or the title of the present disclosure may be made to avoid obscuring the purpose of this section, the abstract and the title. Such simplifications or omissions are not intended to limit the scope of the present disclosure.

Generally speaking, the present invention is related to a user-friendly environment that users can concurrently access and manage resources with ease. According to one aspect of the present invention, a web-based computer user working environment (herein "WCUWE") is disclosed. Some aspects of the WCUWE are described in co-pending U.S. application Ser. Nos. 10/713,904 and 10/713,905, both of which are hereby incorporated by reference in each one's entirety. A central-controlled distributed scalable virtual machine (herein "CCDSVM") is formed to achieve and realize a flexible working environment for users of the CCDSVM. The WCUWE provides a mechanism to allow users to access and operate the provisioned systems of a CCDSVM from any web browser on any remote system or devices. With the capability of expanding a CCDSVM across the Intranet and Internet with its strong security control, the WCUWE can meet the increasing demand for a more secure, more mobilized, more flexible and more cost saving computational solution.

BRIEF DESCRIPTION OF THE FIGURES

These and other features, aspects, and advantages of this invention will become better understood with regard to the following description, appended claims, and accompanying drawings where:

FIG. 1 shows a system view of a CCDSVM according to one embodiment of the present invention;

FIG. 2a shows an exemplary CCDSVM with a single control management system;

FIG. 2b shows an exemplary CCDSVM with identical client host and system unit;

FIG. 2c shows an exemplary CCDSVM with client hosts for non-web based accessing;

FIG. 3 is an example of functional block diagram of a WCUWE for the CCDSVM;

FIG. 4 shows a simplified example of a multi-layered item list (MLIL);

FIG. 5 shows some examples of an operation menu for WCUWE;

FIG. 6 shows an example of an operation menu for different types of nodes on MLIL;

FIG. 7 shows an example of server units grouped by a group ID;

FIG. 8 shows examples of a multi-layered item list (MLIL) with items from other devices, system units or groups; and FIG. 9 illustrates an example of how does the file systems on a system unit in a system group can be accessed.

DETAILED DESCRIPTION OF THE INVENTION

The detailed description of the invention is presented largely in terms of procedures, steps, logic blocks, processing, and other symbolic representations that directly or indirectly resemble the operations of data processing devices. These process descriptions and representations are typically used by those skilled in the art to most effectively convey the substance of their work to others skilled in the art. Numerous specific details are set forth in order to provide a thorough understanding of the present invention. However, it will become obvious to those skilled in the art that the invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

For the convenience of describing some embodiment of this invention, the following terminologies are provided within the scope of this invention.

CCDSVM is an abbreviation for central controlled distributed scalable virtual machine. A CCDSVM is configured to allow a control management system to control a group of computing systems and provide distributed services to client systems in a Intranet, the Internet or in a local area network (LAN) environment. The software components of the CCDSVM form a virtual operating environment or system.

Computer User Working Environment (CUWE):

Every computer system provides an end user a working environment (CUWE), which usually runs on top of a generic operating system. The CUWE allows a user to setup an authentication profile for each different user, to configure system resources from storage, network, file system, file folders structure, files and all other available resources on the system, to monitor system activities, to access applications, and to manage data files such as moving data from one folder to another folder or moving data from one system to another system. Specially, a CUWE is configured to provide a multi-task mechanism. Therefore, a user can perform multiple tasks concurrently after they successful log in the CUWE.

Web Based Computer User Work Environment (WCUWE):

The web-based computer user work environment (WCUWE) of this invention runs on top of a generic operating system in a single or among multiple computers. It allows one or more users to work on one or more computers through a conventional web-browser either remotely or locally, from a device such as a laptop computer, a PDA, or a desktop computer. It provides great mobility and flexibility to the user(s). With this web based computer user work environment, the entire CCDSVM system can be operated like a single virtual machine.

The Resources:

In general, resources on a computer or any other electronic device refer to, but not limited to, CPU, memory, storage device, network device, monitor or other display devices, keyboard, mouse, photo or video record devices, wireless device, user authentication profiles, and various form of deposited data in a storage device. The deposited data in a storage device could be a file system structure, folders, data files, formed raw data and others that are not limited to these in this invention. A data file can be in all kinds of form, such as plain text form, binary data form, PDF form, MPEG or JPEG form, or other various image data forms, MS power point data form or Word documentation form without limit. The storage could be in any media form such as hard disk drive, magnetic tape drive, various form of memory devices, or others suitable media, which shall not limit the scope of storage mentioned in this invention. In addition, it should be noted, unless specifically discussed, whenever a resource in a computer, a system or a device is discussed, it means any form of computing power, data, or capacity the computer, the system or the device has or able to access.

Standard Structured Information:

A web browser can interpret data in a standard structured format (formatted information) and display the data as web pages so that people can view, manipulate, and interact with the information. The standard formatted information is imposed and encoded by following the syntax of a programming language such as HTML (Hypertext Markup Language), XHTML, DHTML, XML, or any other various suitable languages, whichever is best to describe the structured information without limit. In practice, these languages (HTML, XML, . . . ) themselves are often referred as a standard for web page programming. Therefore, in this disclosure, it is not necessary to specify what standard is being used as long as data or resources are presented in a way that is suitable for web communication.

Multi-Layered Item List (MLIL):

A multi-layered item list (MLIL) is a logically organized information list with certain order. Each entry in an MLIL contains an item and each item may contain another layered list of items, where each of the items may represent a physical resource or information of the computer systems or devices. For example, the information of files and folders of a file system on a modern computer system is typically organized as a multi-layers item list, so that the files and folders can be entirely viewed, displayed and operated in a UI window of a computer system supported by modern computer operating system. Likewise, each item (also referred to as a node) on an MLIL may represent a folder or a file. Actually, the information of computing systems or devices on a network, the information of hardware components on a system such as disks, network cards, memory, and the information of users on a system can also be organized into an MLIL. The supporting of the MLIL in a WCUWE makes the system resources and information much easy to be displayed, viewed, and operated in a browser. In general, an MLIL contains at least one item (node) and as many as multiple hundreds items (nodes) with any number of layers as needed.

The System:

The system mentioned in this invention can be a desktop computer, laptop computer, various types of server computers, PDA, or cell phone or other devices with communication ability across a communication network without limit.

The OS (Operating System):

The operating system (OS) mentioned in this invention can be any suitable operating system such as Windows, Linux, various Unix, real-time operating system and others without limit.

Programming Languages:

The programming languages, which used for implementing all software mentioned in this invention, could be any suitable languages or a combination of the suitable languages such as C, C++, Java, JavaScript, Visual Basic, C sharp, HTML, XML, DHTML, XHTML, and others without limit.

Communication Protocols:

The communication protocols to be used in the CCDSVM could be various types that are appropriate for transmitting required data across a communication network. The communication protocols could be IP-based or non-IP-based. The IP based protocols are built on top of IP protocol that could be standard protocols such as TCP protocol, UDP protocol, ICMP protocol, and others. The IP based protocols also can be non-standard proprietary protocols. The non-IP based protocols can be ISO 8473, ISO 8208, or serial communication, or data link layer protocols like LLC 802.2, or HDLC, or any proprietary protocols bellow the IP protocol level without limit.

The Communication Protocols for Web:

The communication protocols for web computing in this invention could be HTTP, SOAP, WAP, or others without limit.

The Web Browser:

The web browser could be any existing commercial software from any vendor such as Microsoft IE, Netscape, Firefox, Mozillar, or other commercial or proprietary software. The web browser must be capable to handle web protocols such as HTTP, SAOP, WAP or others, and be able to interpret the standard structured formatted information such as web page without limit.

The Web Server Software:

The web server software mentioned in this invention could be a commercial software from any vendor such as Apache of open source foundation, IIS of Microsoft Corporation, or others on the market, and it also can be a proprietary software. The web server software must be able to handle web protocols such as HTTP, which is a protocol built on top of TCP protocol. Therefore, the structured information for web communication can be transmitted to said web browser across a communication link by the web server if the web server and web browser are located on two different systems or through inter-process communication if both of the web server and web browser are located on a same computing system.

User Session with the CCDSVM:

A user session is started at a time a user login (log on) to a CCDSVM from a web-browser and is ended at a time the user logout the CCDSVM from the same web browser. During a session, users can perform tasks which have been permitted by a security profile.

One of the objects, advantages, and benefits of this invention is to provide a web-based computer user work environment (WCUWE) which provides web based multi-task support and automatically and dynamically provision and form one or multiple various service pools in cross-domain environment. With the WCUWE, the entire CCDSVM can be accessed and managed from a web-browser regardless where the users are located. In addition, the WCUWE permits multiple users, each from a web-browser to concurrently access and manage the CCDSVM with multi-tasking capability.

Since the emergence of window graphic user interface based computer user work environment (CUWE), users are able to display, view and operate data and hardware resources in a computer system or device by using a pointing device (e.g., a mouse). By clicking through a multi-layered item list, such as a file or folder list displayed in Microsoft Windows OS, a user can navigate to an item in any level in the list. In other words, supporting a multi-layered item list has become a critical part of window based computer user work environment. However, within the CCDSVM, how to let multiple concurrent users to effectively simultaneously display, view or operate an item list in a single web-browser for the available resources or data, such as for deeply nested files & folders or for multi groups of provisioned systems or devices or others is an unprecedented challenge. This is caused by the difficulty for implementation of displaying and operating multiple layered file system (folder structure) in a web environment. For example, due to such difficulty, Yahoo's web service of Briefcase (a document structure) can only be displayed with two levels and operated one level at a time. As a result, such a hierarchically organized document structure can not be conveniently accessed in a same way as it were in the local Windows' environment of a computer. For example, unlike implemented in the local Windows environment of Microsoft, the essential file or folder operations of copy/paste or move can not be performed cross multiple nested layers of folders in the document structure of Yahoo Briefcase.

Referring now to FIG. 1, it shows an example simplified block diagram of an embodiment of a typical CCDSVM, which includes:

Console Hosts (1):

A console host 1 can be any computing system on a network and run a suitable OS. However, it must have a web browser 9 installed, where the browser 9 is used for accessing and operating the entire CCDSVM. The web-browser 9 can be implemented with any suitable or a combination of suitable programming languages. One example of the browser 9 is the Internet Explorer (IE) from Microsoft Corporation. Optionally, Web-Console is another name for the web-browser 9 on a console host 1. From the web browser 9 by following a web URL link to another computing system or on the same system, a user can obtain a WCUWE and further access, manage and operate the entire system. The term of the web-console used sometimes is to indicate its ability to access system information and perform system operation in the CCDSVM by privileged or authorized users. A console host 1 may also include other software modules 13, which may be implemented with any suitable programming languages. These software modules 13 may communicate with a control management system 2 using IP based, non-IP based protocols or any suitable protocols to receive or send data between a console host and the control management system 2. To support a non-web-based networked console, the software used for the console must handle protocols other than web protocols such as HTTP, SOAP, WAP or others. Further this software of the console host 1 must communicate with console supporting software 6 on the control management system 2. The console host 1 is similar to the client system 10 except it is dedicated to a user who takes a system administration role for the CCDSVM.

Control Management System:

The control management system 2 is a computing system on the network and can have any suitable OS running on it. The control management system 2 includes web server software 7 and console supporting software 6. The console supporting software 6 includes web server interface software modules 5 and control management software modules 4. The control management system 2 may also have a Web browser used as a web-console 9. The web server software 7 is configured to send data to and receive data from a web console 9 on a console host 1 or from a web-browser of client 10 based on HTTP or other suitable protocols for web contents delivery.

The console supporting software 6 and the web server 7 can be implemented with suitable or a combination of suitable programming languages. In one embodiment, the web server interface 5 of the console support software 6 may be extended to provide service as the web server software 7 does. In this case, there is no specialized web server software 7 needed.

System Unit:

The system unit 3 could be any type of computing system having a suitable OS running and containing service software modules 8, which is capable to communicate with other computing system (device) on the network. For example, the service software modules 8 of the system unit 3 can communicate with the control management software 4 of the control management system 2 to carry out tasks for viewing or operating its resource and can also communicate with the client system 10 to deliver the required services, or to communicate with another system unit 3 to transfer data.

The service software modules 8 may include an individual software module dedicated to handle the HTTP protocol or other web protocols if there is a need for web-based communication with the client system 10 or other system unit 3 or the control management system 2. This individual software module could be commercially available web server software on the market or could be a proprietary software module.

Net1 11 is a network infrastructure of the Internet or a Intranet, or a local area network (LAN), or wide area network ("WAN") which provides communication links between the control management system 2 and the console-host 1 or the client system 10. It also provides communication link between the system unit 3 and the client system 10. The net1 may consist connection media such as connecting cable of Ethernet, optical Fibre, and other; wireless communication media for providing wireless communication links through air; and data bus on circuit board. The Net1 also consists of communication equipment such as switches, routers, and adapters, etc. and all other possible elements of communication equipment.

The net2 (12) is also a network infrastructure of Internet or Intranet, or LAN or wide area network ("WAN"), which comprises similar connection media and equipment as the Net1 11 having and provides communication links between the control management system 2 and the system units 3 or the consoles host 1. It also provides the communication link between the system unit 3 and the client host 10.

Client Host:

The client hosts 10 are not part of the CCDSVM, but with the permission and authorization, they can get services from and access to the CCDSVM using the web-browser 9.

The Data Flows in the CCDSVM:

According to one embodiment, there are 4 basic data flow paths within a typical CCDSVM:

(1) Data path 1 is for data flow through a communication link between the web browser 9 on the client host 10 (or on the console host 1 or the control management system 2) and the web handling software on the control management system 2, such as web-server 7 and the console support software 6. With this path of data flow, whenever the user sends a request from the web-browser 9 to the web-server 7 and further down to the console support software 6, the console support software 6 collects all required information (i.e., metadata) from a target system and converts them into standard structured information for web communication. The targeted system could be the system unit 3 or the control management system 2 itself. The information collected by the console support software 6 of the control management system 2 could be the system status, or the storage information, or the network information, or the user authentication profile, or the file system information or files and folders information or others on a target system. The collected information is not limited to these mentioned above in this invention. The console support software 6 then passes this converted structured information to the web server software 7 and further transmits them to the web-browser 9 through communication link, net1 11 or net2 12, so that it can be displayed and viewed by the conventional web browser 9.

The communication protocol used between the web-browser 9 in the client host 10 or the console host 1 and the web server 7 in the control management system 2 could be HTTP or other suitable protocols for web communication, which could successfully transmit the data over the web.

(2) The data path 2 is the data flow through communication link between the control management system 2 and the system units 3.

With this path of data flow, the requests targeted to the system units 3 are passed from the console support software 6 in the control management system 2 to the service modules 8 in the system unit 3 through the communication link net2 12. If the responses to those requests must return back to the control management system 2, the service modules 8 in the system unit 3 carry out the requests and then send the response back to the console support software 6 in the control management system 2. The communication protocol used between the console support software 6 in the control management system 2 and the service modules 8 of the system unit 3 can be any suitable protocol for transmitting data between them. The typical data flow through this path could be a boot message, a system status, network information, or storage information in the system unit 3. It should be noted that the actual data flow though this path is not limited to those mentioned here.

(3) The data path 3 is the data flow through a communication link between the system units 3 and the client host 10 or the console host 1.

With reference to FIG. 1, in some cases, the console support software 6 of the control management system 2 may present a web link, pointing to an object on the system unit 3, to the user working on the web-browser 9 of the client host 10, the console host 1, or the control management system 2. The object pointed at by the web link on the system unit 3 could be a file of text, mpeg video, a text file, PDF, MS power point or Word documentation that is not limited to these types. It could also be a link of another web service program. From the web browser 9, the user can directly access the information on the system unit 3 pointed at by the web link without going through the control management system 2 again. In this case, the service modules 8 of the system unit 3 must also include a web server software to directly support the web browser 9 access as mentioned before.

(4) The data path 4 is data flow through a communication link between the system unit 3 and another system unit 3.

With this path, the service modules 8 in the system units can directly transmit data or information to the service modules 8 of the another system unit via the communication link net2 12 without going through the control management system 2. The communication protocol between the system units 3 could be IP-based or based on suitable non-IP-based protocol. The data and information transmitted through the path 4 can be in various type such as a data file. For example, a user on the web-browser 9 may navigate through a file folder on a system unit 3. Later, the user instructs to transfer a file from the file folder on the current target system unit 3 to another targeted system unit 3 by clicking, therefore, the data file will be transferred directly between two system units 3 without going through the control management system 2 again.

The Variation of the CCDSVM Configuration Models:

FIG. 2*a* shows a figure for an example of the CCDSVM with a single control management system 2. With this model, there is no any system unit 3, therefore, the CCDSVM degenerated into a single system and the WCUWE just works for the single system, which is the control management system 2. Thus a user from the web-browser 9 of the console host 1, a client host 10, or a control management system 2 can access and operate the entire resources on the control management system 2.

FIG. 2*b* is a figure of an example of a CCDSVM with identical client host and system unit. This model is substantially similar to the model of a typical CCSDVM shown in FIG. 1, except there is no difference between the client host 10 and the system unit 3 since each system unit is also configured with a web-browser 9 and each client host 10 is also configured with service modules 8. This means that each system unit/client shall play both roles of a system unit and a client host 10. With this model, a user on each system unit/client can login the control management 2 from the web-browser 9 and further access and operate the resources on the control management system 2, or on other system unit/client with security permission.

FIG. 2*c* is an example of the CCDSVM with non-web accessed client t 10. This model is substantially similar to the model of an exemplary CCDSVM shown in FIG. 1, except that the client host 10 has its own service modules 14 for non-web based access instead of using a web-browser for accessing. For example, if the system unit 3 is a SAN unit providing storage volumes, and one of the service modules 14 of the client host 10 is a driver routine for reading data from and writing data to a disk volume on the system unit 3. The client host 10 may also have a web-browser 9 to access the system unit 3 for other purposes except for accessing disk volumes.

FIG. 3 shows an example of software modules of the WCUWE for a typical CCDSVM. The software modules of the WCUWE can be implemented with any suitable or a combination of suitable programming languages such C, C++, Java, JavaScript, Visual Basic, HTML, XML, etc., which means that software of the WCUWE is programming language independent.

The software of the WCUWE may include following:
1) web server interface modules 5 of the console support software 6 on the control management system 2.
2) control management modules 4 of the console support software 6 on the control management system 2.
3) web server software 7 on the control management system. The web server software 7 could be commercially available web server software on the marketing such as Apache or MS IIS or others, and also could be proprietary software. If the web server interface modules 5 provide compatible functionality with the web server software 7, then the web server software 7 may not be needed.
4) service software modules 8 on the system unit 3. The service software modules 8 may include web server software 7 or a software module, which provide equivalent functionality as the web server software 7 does.
5) web browser 9 on the console host 1, on the control management system 2, or on the client host 10. The web browser 9 could be a commercial web browser on the market such as MS IE, or Netscape, and also could be proprietary software modules.

FIG. 4 shows simplified examples of a Multi-Layered Item list (MLIL).

FIG. 4*a* illustrates a multi-layered item list contains multiple nodes and multiple layers. A node on an MLIL can be expanded to display sub-node if there is any by clicking. The sub-nodes may be reduced by mouse clicking on the same node again.

FIG. 4*b* illustrates a degenerated Multi-layered items list containing a single node (i.e., a single layer).

FIG. 5 shows simplified examples of operation menu for the WCUWE of the CCDSVM that includes:

FIG. 5*a* illustrates a web based drop-down menu for disk volume management. The drop-down menu can be invoked by right clicking on an item (node) on MLIL.

FIG. 5*b* illustrates a web based selective menu for system unit management. The item selected and further click the submit button.

FIG. 6 shows simplified examples of operation menu for different types of node on an MLIL that includes:

FIG. 6*a* illustrates an operation menu for managing the storage (disk).

FIG. 6*b* illustrates an operation menu for managing the file.

FIG. 6*c* illustrates an operation menu to manage the system unit on network.

FIG. 7 shows an example of an MLIL displayed for system units grouped by a group ID.

This figure shows one example of five system units being divided into two groups, a marketing group and an engineer group. The marketing group contains 2 system units while the engineer group contains 3 system units. The groups are automatically and dynamically formed when the system units boot up.

FIG. 8 shows an example of an MLIL combined with mixed devices, system units and system groups that include:

FIG. 8*a* illustrates an example of a top level of an MLIL is for system group, the second level is for system unit, the third level is for device of disks.

FIG. 8*b* illustrates an example of a top level of an MLIL is for system group, the second level is for system unit, the third level for a file folder comprising files.

The Initiation of WCUWE:

The WCUWE can be established via a sequence of steps that are performed by the console support software 6 of the control management system 2 as below:

Referring back to FIG. 1, according to one embodiment, the console support software 6 collects all major resources information of the control management system 2 and converted the information to a standard structured format, which is viewable in the web-browser 9. The resources information mentioned above include the resources of the storage, network, file system, files, folders, users, system status and others, which can be collected whenever the control management system 2 is boot up or at an appropriate time. The resource information may be stored in memory for fast retrieve at another time and also may be stored on permanent storage such as disks.

The console support software 6 communicates with the service modules 8 of the system unit 3 to collect all major resources information of the system unit 3 through the communication links of net2, e.g. via executing an service pool automatic construction protocol between the control system 2 and each of the system units 3 as illustrated in parent application Ser. No. 10/713,905. Further, the console support software 6 stores (binds) the collected information of the system units 3 as a network information list on the control management system 2. In addition, upon users' accessing, the collected network information is organized and converted to a standard structured format for web communication, and subsequently is viewable in the web-browser 9. The collected network information includes the information of the system units 3 and their storage device, network devices, wireless devices, video and audio record & playback devices, file-system, users, system status and all others on net. The network information can be collected whenever the system units 3 is boot up or at an appropriate time.

Further, the network information list can be kept by the control management system 2 in memory for later fast access and can be organized into any suitable logical structure, for example as a simple list of array, a linked list, a double linked list, a hash table, a tree structure and etc. The network information list can also be stored on permanent storage such as disk or others for the backup purpose. In addition, the network information can be stored in any form on permanent storage, such as the form of commercial database, a binary record file, a flat text ASCII file or others. All specific examples of the form of data depository or logical structure mentioned above are for illustration only, and they shall not be limited to these mentioned herein in this invention.

After the initiation of the WCUWE, each of the users is allowed to log in, from a web-browsers 9 to the CCDSVM and can concurrently display, view, access, & operate various resources and information of the CCDSVM.

Users Interaction, Access and Manage Resources with the WCUWE:

Users from the client host 10, the console host 1, or the control management system 2 can log into the WCUWE of the CCSDVM via a web URL link provided by the software of the WCUWE (see FIG. 3). The software of the WCUWE presents information and resources on the control management system 2 and on the server units 3 to the users after their login from the web browser 9. Subsequently, whenever a user requests to access or operate a major resource either on the control management system 2 or the system unit 3 of the CCDSVM, the software modules of the WCUWE is configured to create a corresponding user task for such a request on the targeted system. For example, a task may be generated through selecting a node on a MLIL or through selecting an option from an operation menu. In one embodiment, the software of the WCUWE is configured to support multiple concurrent tasks for a user from a single web-browser 9 and also to support multiple concurrent users each from his or her own web-browser 9 to perform such tasks while providing best security protection for the resources being accessed by the multiple users.

The Use of Multi-Layer Item List in the WCUWE:

In order to provide convenience for each of the login users to perform tasks in the WCUWE, the console support software 6 may use a logical structure of multi-layer item list (MLIL) as illustrated in FIG. 4 together with the associated web-browser based operation menu as illustrated in FIG. 5 for operating corresponding actual multi-level organized resources. The resources as mentioned before could be the files, and folders of a file system, the system units 3 on the network, the users and their security profile and others. If there is a need to create a structured multi-layer item list (MLIL) of FIG. 4 for mirroring structured resources for target systems upon each login user trying to access and operate, the console support software modules 6 of the control management system 2 are configured to do the following:

a) For each of user sessions of login users, a memory management module of the console support software 6 create an MLIL as illustrated in FIG. 4. The MLIL can be flexibly expanded or reduced by (mouse) clicking while the MLIL is displayed in a web-browser, where the created MLIL mirrors an actual resource structure. Further, the console support software 6 makes an association between each created MLIL and the actual targeted resources. The created MLIL can reside in memory and can be in any form of a list structure such as a simple array list, link list, double link list, various tree structure, or hashed table, etc.

b) For each created MLIL, binding a corresponding graphic or text representation to each node (item) on the MLIL, and associating each of the nodes (items) with appropriate attributes. These attributes shall reflect the characteristics of a actual resource, such as name, type, level, size, the total number of sub-nodes and so forth that is not limited to the mentioned above, therefore, the actual structured resources can be correctly displayed through the MLIL.

c) Link a corresponding operation menu to the MLIL. The operation menu can be either a web-based drop-down menu 1 as shown in FIG. 5 or a non-drop-down selective menu 2 as shown in FIG. 5.

d) Convert the created MLIL and all its associated information into the standard structured information (web page) for web communication, such that to be viewable and accessible via the web-browser 9. Thereafter, the MLIL can be either viewed in a web-browser 9 on the control management system 2 or viewed by a web-browser 9 on the client host 10 or the console host 1. The converted multi-layered item list needs to be transmitted via a communication link net1 11 or net2 12 from the control management system 2 to the client host 10 or the console host 1. The converted multi-layered item list can be transmitted using a web protocol such as HTTP or any other suitable protocols in order for users remotely view it from the web-browser 9.

e) After user taking action of either viewing, or operating resources represented by the MLIL, the console support software 6 modifies the MLIL through the memory management module of the console support software 6. Also, the memory management module of the console support software 6 keeps tracks of the memory usage and status for the correspondent MLIL as the results of expanding or reducing the MLIL when a user accesses or operates a resource represented by this MLIL. For example, the deleting a file folder operation requires to delete an actual folder on a file system and delete the corresponding node on the MLIL. Most importantly, all processes or threads created to perform tasks of operating the resources represented by the MLIL can effectively share the dynamically modified MLIL with a consistent view throughout the each users' entire login session. The memory management module of the console support software 6 may need to translate and map the initial logical memory address of the MLIL to another logical memory address, therefore, the different processes or threads of the same user session can effectively access the same actual MLIL memory object during the user session.

f) The steps described from b) to e) above can be repeatedly processed as long as a user keeps working on the same resource represented by this specific MLIL.

For each of logout users, the created MLIL for the user session will be deleted through the memory management module of the console support software 6. Further if a user stops accessing the current related resource and requests to access a total different resource, the original MLIL will be deleted and a new MLIL will be created.

The Support of Deeply Nested Files & Folders Lists on Systems within the WCUWE of the CCDSVM:

The accessing and managing a file system always has been an important part of a computer user work environment (CUWE) in the past. Supporting a file system to be accessed by users from a network has always being a challenge to many vendors. With this invention, a user can manage storage volumes of the entire CCDSVM from a web browser 9 and further can create, manage, and access the file system on either the control management system 2 or the system unit 3. With a sophisticate method of using the multi-layer item list as shown FIG. 4 together with the operation menu shown in FIG. 5 for the file system in the WCUWE of the CCDSVM of this invention, users can efficiently access and manage files and folders in the file system from a web-browser 9 on the fly without caching anything for the file system.

With this method, the multi-layer item lists (MLIL) is used to represent an actual file folder structure of a file system on a target system of the CCDSVM, where a node (item) on the MLIL represents a folder or a file or the file system. When a user navigates through the file system and clicks on a node of the MLIL to operate a file or a folder from a web-browser 9, only a small piece of information, which is related to the file or folder, needs to be retrieved or transmitted between a target system of the CCDSVM and the control management system 2. For example, if a user wants to add or delete an item such as a folder, the only major information needs to be transmitted is the folder's name from the control management system 2 to the target system and the target system shall carry out the task. If a user wants to access the information, which is bellow a current item on the MLIL, such as a folder, after sending the folder name, the only information that needs to be retrieved from the target system is the sub-folder or file names if there is any under the current folder. If the user wants to set access permission for a file or a folder on any of target systems for one or more designated users to access, the target system information and file or folder information on the network need to be bound with each designated user's security profile. The target systems could be either the control management system 2 or any of the system units 3 in the CCDSVM.

If a user needs to view or edit the content of a file on a system unit 3, the file may be transmitted via the communication link net 1 & net 2 directly from the target system to the client host 10 or the console host 1, without going through the control management system 2. If the file is on the control management system 2 and users like to view or edit it from a remote system, the file is transmitted via the communication net 1 to the client host 10 or the console host 1. With a proper viewing tool on the client host 10 or the console host 1 or the control management system 2, which may be invoked from the web-browser 9, the user is able to view the contents of the file. With a proper editor, user can further edit the file and then transmit the file back to the target system. The target system could be either a system unit 3 or the control management system 2. Alternatively, the file may also be transmitted from the target system to the control management system 2 and then convert it from original format to a format, which may be viewed and edited in the web-browser 9. After converting, if the target system is not the control management system 2, the file can be transmitted via the communication link net 1 or net 2 from the control management system 2 to the client-host 10, the console host 1 for viewing or editing with a web-browser 9. If the target system is the control management system 2 itself, there would be no such transmission required.

The Support of the Automatically & Dynamically Provisioning Groups of Systems in the WCUWE of a CCDSVM:

Network information is an important part of the WCUWE. In one embodiment, the system (server) units 3 of the CCDSVM can be automatically and dynamically provisioned into multiple system groups (pools) based on their group ID, where each system group contains at least one system (server) unit 3 ("provisioned system"). Specially, the group ID is sent by each of the system units 3 via a packet to the control management system 2 across a network during boot time of each system unit 3.

In addition, one or more of system groups (service pools) can be automatically constructed via executing a service pool automatic construction protocol between a control management system 2 and each of the system units 3. In one embodiment, the console support software modules 6 of the control management system 3 automatically collecting information of each of the system units 3 and adding each of the system units 3 into one of system groups (service pools) based on the group ID received during boot of each of the system units 3. The information of the system units including their IP address, system name, system or service type and their group ID.

To effectively access and manage such grouped system units 3 and their associated devices, such as storage or network interface cards or terminal monitor or video & audio recorder (e.g., camcorder, or keyboard & mouse), or wireless devices or file systems on the network, the multi-layer item list (MLIL) can be used. Therefore, the mixed information on the network can be ordered with a top-down fashion such that each server group at top level, the system units 3 at the second level, and the hardware devices or file system start from the third level and so on within the MLIL.

More specifically, a node on the MLIL with different level or type may associate with a different type of operation menu. For example, a node of the system unit 3 on the MLIL may be associated with an operation menu containing options for monitoring system status, for performing system shutdown, storage management, or change usage etc. and a node of storage device may be associated with an operation menu for creating a storage volume, displaying storage volume, combine storage volume, and delete a storage volume and so on. After converting all information associated with the MLIL to a standard structure, the complex information on the network can be viewed and operated by a user from a web-browser 9.

For example, FIG. 7 shows the example of how is each of the system units 3 provisioned into multiple groups that is represented by an MLIL. FIG. 8 shows the example of how is device such as storage configured under a server unit 3 in each system group. FIG. 9 shows an example of how can the file system on a system unit 3 in a group be accessed. The method of automatically and dynamically grouping each of the system units 3 and wisely using the MLIL to represent the diversified resources on the network, the entire CCDSVM can be much more efficiently accessed, operated, and managed. For example, through (mouse) clicking on a MLIL in a web-browser, privileged users can create storage volumes from a fresh disk on any target system and make a file system on a storage volume, mount the file system and create a folder structure on the file system, and further setup access control for user having limited privileges for accessing resources of the CCDSVM. Therefore, the WCUWE can securely let permitted user access the resource from a web-browser anywhere on the network.

The Support of the User Administration & Authentication in WCUWE of the CCDSVM:

Initially, the WCUWE allows a default super user to login the WCUWE of the CCDSVM and to access an authentication web-page provided by the console support software 6. This privileged user can setup other privileged or non-privileged users account and their security profiles thereafter. In one embodiment, a user's profile comprises security attributes to determine the specific user is permitted to access from which remote system, to access which specific systems in a CCDSVM, to permit what specific types of tasks on that specific system, and to access what specific files or folders or applications. In addition, the security attributes can be encoded in a security data structure, which each fields can be used to specify a unique characteristic security permission.

Similar to a file system in the WCUWE of the CCDSVM, the user profile can be viewed and operated with using an MLIL combined with a web-based operation menu, and further to convert it to a standard structure, which can be viewed and accessed by the user from a web-browser 9. Therefore, through (e.g. using mouse) clicking on the MLIL for user profiles and a web-based operation menu in a web page, the user can perform operations of user profile creating, viewing, updating, deleting and others. Specially, a privileged user can setup profiles for other non-privileged users for the secure access control. In addition, the user information and their security profiles can be kept in any form in a database, which could be a commercial database on the market, or a plaint text file, or a binary record file, or others.

The present invention has been described in considerable details with preference to certain preferred versions, examples, and figures; however, other versions, and samples are also possible. Therefore, the spirit and scope of the appended claims should not be limited to the description of the preferred versions and samples contained herein.

What is claimed is:

1. A method for control accessing a computing structure of a plurality of computing devices, the method performed by a server comprising steps of:
    creating a multi-layered item list ("list") in a memory to mirror the computing structure, the computing structure comprising a plurality of system groups, each of the system groups comprising information of one or more of the computing devices, the computing devices residing on a network;
    sending the list to an end-user device for displaying the list thereof to facilitate a user navigating the displayed list for selectively accessing each of the system groups;
    receiving a request for accessing a resource of either a first one of the system groups or a first computing device in the first one of the system groups upon the list being used for submitting the request; and
    updating the computing structure and updating the list in the memory according to the request for accessing the resource, and
    sending the updated list to the end-user device for updating the displaying of the list.

2. The method of claim 1, wherein said one or more of the computing devices in each of the system groups are physically clustered on said network of the Internet, a corporate Intranet, a local area network or a wide area network, wherein each of the system groups is automatically formed based on a group identification in a packet received from each of the one or more of the computing devices.

3. The method of claim 1, wherein the list comprises a plurality of nodes for mirroring the computing structure in a reduced form, where each of the nodes comprises a graphic indicator and attributes for reflecting characteristic of a resource in the computing structure, and associates with an operation menu for operating the resource.

4. The server of claim 3, wherein the attributes of the each of nodes comprise name, type, level, size and total number of sub-nodes for reflecting the characteristic of said resource and for controlling display and operations of the resource.

5. The method of claim 4, wherein said display resource comprises: displaying, through the list, full content of a folder in the first computing device, the full content comprising at least next two levels of subfolders below the folder, wherein a subfolder at the first level, below the folder, contains at least a subfolder at the second level below the folder, and each said subfolder contains at least one file.

6. The method of claim 5, wherein said updating comprise: updating the folder in the computing structure and updating the list according a request for accessing the folder for moving or copying/pasting a file or subfolder in the second level below the folder to the folder or vice versa.

7. The method of claim 1, wherein said request for accessing a resource further comprises: accessing storage, on the first computing device in the first one of the system groups, including to create, delete or split storage volume, or combine storage volumes, or create file system for storage volume.

8. The method of claim 1, where in said request for accessing a resource comprises: accessing the one or more of the computing devices in the first one of the system groups for shutting down or rebooting the one or more of the computing devices, or monitoring status of the one or more of the computing devices, or changing the usage of the one or more of the computing devices.

9. The method of claim 1, wherein said sending the list comprises: sending the list through a web page, wherein the web page is encoded with the list.

10. A server comprising:
    at least one hardware processor, and one computer-readable storage device comprising program instructions that, being executed by the at least one hardware processor, configure the server to control accessing a computing structure of a plurality of computing devices on a network, wherein the program instructions comprise:
    program instructions for creating a multi-layered item list ("list") in memory to mirror the computing structure, the computing structure comprising a plurality of system groups, each of the system groups comprising information of one or more of the computing devices;
    program instructions for sending the list to an end-user device for displaying the list thereof to facilitate a user navigating the displayed list for selectively accessing each of the system groups;
    program instructions for receiving a request for accessing a resource of either a first one of the system groups or a first computing device in the first one of the system groups upon the displayed list being used to submit the request; and
    program instructions for updating the computing structure and updating the list in the memory according to the request for accessing the resource, and
    program instructions for sending the updated list to the end-user device for updating the displaying of the list.

11. The server of claim 10, wherein said one or more of the computing devices in each of the system groups are physically clustered on said network of the Internet, a corporate Intranet, a local area network or a wide area network, wherein each of the system groups is automatically formed based on a group identification in a packet received from each of the one or more of the computing devices.

12. The server of claim 10, wherein the list comprises a plurality of nodes for mirroring the computing structure in a reduced form, where each of the nodes comprises a graphic indicator and attributes for reflecting characteristic of a resource in the computing structure, and associates with an operation for operating the resource.

13. The server of claim 10, wherein said program instructions for updating the computing structure and updating the list comprise program instructions for distributing the request to the one or more of the computing devices in the first one of the system groups for carrying out the request.

14. The server of claim 13, wherein said program instructions for updating the computing structure and updating the list comprise program instructions for obtaining status or result from the one or more of the computing devices for said carrying out the request.

15. The server of claim 14, wherein said program instructions for updating the computing structure and updating the list according to the request comprise program instructions for updating information of the first one of the system groups according to the status or result obtained.

16. A method for accessing a computing structure of a plurality of computing devices, comprising:
 forming automatically a plurality of system groups of the computing structure, each of the system groups comprising information of one or more of the computing devices, the computing devices residing on a network;
 creating a first multi-layered item list ("list") in memory to mirror the computing structure for a user session initiated by a first end-user devices of a first user,
 sending the first list to the first end-user device for displaying the first list thereof to facilitate the first user navigating the displayed first list for selecting a resource of either a first one of the system groups or a first computing device in the first one of the system groups to setup permission for granting a second user accessing the resource selected; and
 creating a second multi-layered item list ("list") in the memory to mirror the computing structure for a second user session initiated by a second end-user device of the second user, and
 sending the second list to the second end-user device for displaying the second list thereof to facilitate the second user using the displayed second list accessing the resource according to the permission specified.

17. The method of claim 16, wherein said setup permission for granting a second user access the first one of the system groups or the first computing device further comprises: binding the permission to a security profile associated with the second user.

18. The method of claim 16, wherein each of the first and second lists comprises a plurality of nodes for mirroring the computing structure in a reduced form, where each of the nodes comprises a graphic indicator and attributes for reflecting characteristic of a resource in the computing structure, and associates with an operation menu for operating the resource.

19. The method of claim 16, wherein the one or more of the computing devices in each of the system groups are physically clustered on said network of a corporate Intranet, a local area network, a wide are network or the Internet, wherein each of system groups is formed based on a group identification in a packet received from each of the one or more of the computing devices.

20. The method of claim 19, wherein said granting a second user accessing the resource selected further comprises: permitting to perform task of accessing the one or more of computing devices in a selected system group, monitoring status of a selected computing device, transferring a selected file, configuring a selected storage, or accessing a selected video, audio, photo, file, folder, or user information.

* * * * *